(12) United States Patent
Usami et al.

(10) Patent No.: US 12,492,726 B2
(45) Date of Patent: Dec. 9, 2025

(54) SLIDING COMPONENT AND METHOD FOR MANUFACTURING SAME

(71) Applicant: Hitachi Construction Machinery Co., Ltd., Tokyo (JP)

(72) Inventors: Hatsuhiko Usami, Nagoya (JP); Hideki Akita, Tsuchiura (JP); Shuichi Kobayashi, Tsuchiura (JP); Shigeyuki Sakurai, Tsuchiura (JP); Wataru Minami, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 766 days.

(21) Appl. No.: 17/776,007

(22) PCT Filed: Nov. 10, 2020

(86) PCT No.: PCT/JP2020/041815
§ 371 (c)(1),
(2) Date: May 11, 2022

(87) PCT Pub. No.: WO2021/095705
PCT Pub. Date: May 20, 2021

(65) Prior Publication Data
US 2022/0403878 A1    Dec. 22, 2022

(30) Foreign Application Priority Data
Nov. 12, 2019    (JP) .................. 2019-204957

(51) Int. Cl.
*F16C 33/14*    (2006.01)
*F16C 33/10*    (2006.01)
*F16C 33/12*    (2006.01)

(52) U.S. Cl.
CPC .......... *F16C 33/14* (2013.01); *F16C 33/1095* (2013.01); *F16C 33/121* (2013.01)

(58) Field of Classification Search
CPC ....... C23C 24/04; C23C 24/08; C23C 24/085; C23C 8/26; C23C 8/32; C23C 8/80; C23C 30/00
See application file for complete search history.

(56) References Cited

FOREIGN PATENT DOCUMENTS

| CN | 105624601 A | 6/2016 |
|---|---|---|
| JP | 61-171964 A | 8/1986 |

(Continued)

OTHER PUBLICATIONS

Prasad, B.K. "Sliding response wear of cast iron as influenced by microstructural features and test condition." 2007. Materials science and engineering A. 456. p. 373-385 (Year: 2007).*

(Continued)

*Primary Examiner* — Nicholas A Wang
(74) *Attorney, Agent, or Firm* — Crowell & Moring LLP

(57) ABSTRACT

Provided is a sliding component having a low coefficient of friction and capable of exerting stable sliding characteristics from the initial stage of sliding, and a manufacturing method capable of easily manufacturing the sliding component. A sliding component (1) includes an iron substrate (10), in which graphite particles (13) are dispersed in an iron base (11), and a tin coating (20) formed on the iron substrate (10), the tin coating (20) including tin as a main material. The graphite particles (13) of the sliding component (1) are exposed through the tin coating (20). The manufacturing method includes: a preparation step of preparing an iron substrate (10) including graphite particles (13) dispersed in an iron base (11); and a film forming step of forming a tin coating (20) on the surface of the iron substrate (10), the tin coating (20) including tin as a main material. The film forming step forms the tin coating (20) so that the graphite particles (13) are exposed through the tin coating (20).

5 Claims, 10 Drawing Sheets

(56) References Cited

FOREIGN PATENT DOCUMENTS

| JP | 4-258572 A | | 9/1992 |
|---|---|---|---|
| JP | 2003213486 | * | 7/2003 |
| JP | 2006-111975 A | | 4/2006 |
| JP | 2006111975 | * | 4/2006 |
| JP | 2012-247029 A | | 12/2012 |
| JP | 2012247029 | * | 12/2012 |
| JP | 6196800 B2 | | 9/2017 |

OTHER PUBLICATIONS

International Search Report (PCT/ISA/210) issued in PCT Application No. PCT/JP2020/041815 dated Jan. 19, 2021 with English translation (six (6) pages).
Japanese-language Written Opinion (PCT/ISA/237) issued in PCT Application No. PCT/JP2020/041815 dated Jan. 19, 2021 (three (3) pages).

* cited by examiner

SLIDING COMPONENT AND METHOD FOR MANUFACTURING SAME

TECHNICAL FIELD

The present invention relates to sliding components including a metal coating formed on the surface of an iron substrate, and methods for manufacturing such a component.

BACKGROUND ART

Conventionally, sliding components have been used in machines such as industrial machinery, aircraft, and vehicles. Such sliding components are required to have various characteristics such as wear resistance, low friction characteristics, and seizure resistance.

Patent Literature 1, for example, proposes such a sliding component including: a substrate having a sliding surface; an intermediate layer formed on the surface of the substrate; and a surface layer on the surface of the intermediate layer, the surface layer having solid lubricant particles embedded therein. The substrate of this sliding component is made of an iron-based material such as carbon steel, and the solid lubricant particles are made of graphite.

CITATION LIST

Patent Literature

Patent Literature 1: JP 6196800 B

SUMMARY OF INVENTION

Technical Problem

The sliding component according to Patent Literature 1 has the surface layer including solid lubricant particles. These solid lubricant particles of the surface layer, however, may fall from the intermediate layer depending on the sliding conditions of the sliding component. As a result, this sliding component may fail to keep a low friction coefficient and stable sliding characteristics.

Considering this point, the manufacturing method according to Patent Literature 1, for example, includes the step of pressing the surface layer against the intermediate layer so as to push the solid lubricant particles of the surface layer into the intermediate layer. These solid lubricant particles are uniformly dispersed in the intermediate layer, which means that the friction coefficient fluctuates and becomes unstable at the initial stage of sliding because the intermediate layer having the solid lubricant particles is not yet worn.

In view of these points, the present invention aims to provide a sliding component having a low coefficient of friction and capable of exerting stable sliding characteristics from the initial stage of sliding, and a manufacturing method capable of easily manufacturing the sliding component.

Solution to Problem

A sliding component according to the present invention includes: an iron substrate including graphite particles dispersed in an iron base; and a tin coating on the iron substrate, the tin coating including tin as a main material. The graphite particles are exposed through the tin coating.

A method for manufacturing a sliding component according to the present invention includes: a preparation step of preparing an iron substrate including graphite particles dispersed in an iron base; and a film forming step of forming a tin coating on the surface of the iron substrate, the tin coating including tin as a main material. The film forming step forms the tin coating so that the graphite particles are exposed through the tin coating.

Advantageous Effects of Invention

A sliding component according to the present invention has a low coefficient of friction and is capable of exerting stable sliding characteristics from the initial stage of sliding. The method for manufacturing a sliding component according to the present invention enables easy manufacturing of a sliding component having such sliding characteristics.

Other problems, configurations and advantageous effects of the present invention will be clear from the following descriptions of the embodiments.

DESCRIPTION OF EMBODIMENTS

Referring to FIGS. 1 to 6, the following describes sliding components according to first to third embodiments of the present invention.

First Embodiment

Figure 1:
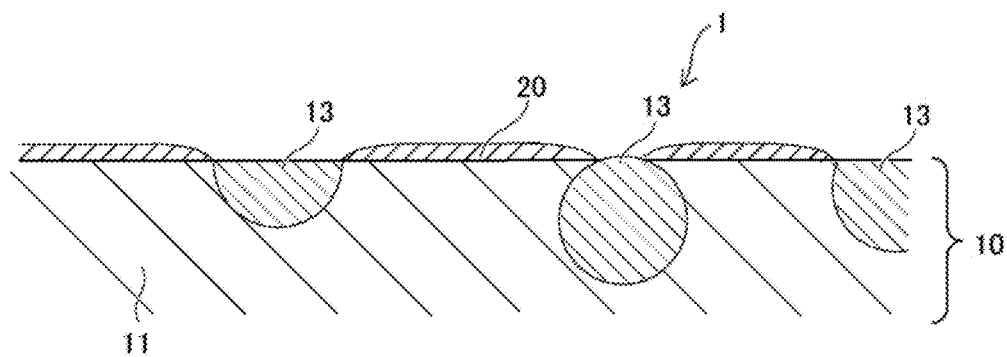
FIG. 1 is a schematic cross-sectional view showing an example of a sliding component that is a first embodiment.

As shown in FIG. 1, a sliding component 1 of the present embodiment includes an iron substrate 10, in which graphite particles 13 are dispersed in an iron base 11, and a tin coating 20 formed on the iron substrate 10, the tin coating 20 including tin as a main material. The following describes these iron substrate 10 and tin coating 20 in details.

1. Sliding component

The following first describes the sliding component 1 according to the present embodiment, and then describes a method for manufacturing the sliding component 1.

1-1. Iron Substrate 10

The iron substrate 10 in the sliding component 1 of the present embodiment includes the graphite particles 13 dispersed in the iron base 11 so that the graphite functions as a solid lubricant, thus enhancing the sliding characteristics of the sliding component 1. The iron substrate 10 therefore may include the graphite particles 13, and may be an alloy including iron and carbon as main materials and containing 1.5% by mass or more of carbon or may be a sintered body prepared by compact molding of iron-based alloy powder and graphite powder, followed by sintering. For example, when an alloy including iron and carbon as main materials is used, the amount of carbon contained in the iron base 11 may be 1.5% by mass or more, which allows graphite contained in the iron base 11 to be deposited. Therefore, not only cast iron but also cast steel can be used as the iron substrate 10 in this case.

As long as the graphite particles 13 are dispersed in the iron base 11 and the graphite particles 13 are exposed on the surface (the surface that is a sliding surface described later) of the iron substrate 10, the configuration is not particularly limited. The material of such an iron substrate 10 includes cast iron containing 2.1 to 6.7% by mass of carbon, and examples thereof include spheroidal graphite cast iron, gray cast iron, and black heart malleable cast iron.

The present embodiment describes spheroidal graphite particles as an example of the graphite particles 13 and spheroidal graphite cast iron (ductile cast iron) as an example of the iron substrate 10 including the spheroidal graphite particles 13. When the spheroidal graphite cast iron is used, the iron base 11 of the iron substrate 10 may be made of ferrite. Examples of the iron substrate 10 include FCD370, FCD400, FCD450, and FCD500 (JIS standard). When ferrite is used, the iron base 11 can contain more graphite particles. The iron base 11 of the iron substrate 10 may include pearlite, and examples of the iron substrate 10 include FCD600, FCD700, and FCD850 (JIS standard). The iron substrate 10 may be quenched, nitrided, or nitrocarburized.

1-2. Tin Coating 20

The tin coating 20 is a film including tin as a main material. In the present embodiment, the tin coating 20 has a function of retaining graphite fine particles removed from the graphite particles 13 of the iron substrate 10 during sliding. The tin coating 20 has another function of plastically flowing when it comes into contact with the mating member during sliding, and enhancing the running-in property of the sliding surface of the sliding component 1 at the surface of the iron substrate 10. This tin coating is a film including tin as a main material.

Note here that the tin coating 20 is made of a soft metal material that is less work hardening. Specifically, the "tin coating 20 including tin as a main material" means the tin coating 20 including 50% by mass or more of tin. For example, the tin coating 20 may include tin and unavoidable impurities. In another example, the tin coating 20 may be a film in which another metal material is added to tin of 50% by mass or more, and preferably the Vickers hardness of the tin coating 20 is in the range of Hv 5 to 100. Examples of the other metal materials include silver, gold, platinum, zinc, antimony, lead, indium, and bismuth.

In particular, considering sliding under the supply of general lubricating oil, the tin coating 20 preferably includes another metal material added to tin so that the melting point becomes 200° C. or higher. Preferably, such a tin coating 20 includes zinc or silver added to tin. In particular, the addition of zinc or silver to tin can increase the corrosion resistance of the tin coating 20.

The thickness of the tin coating 20 is preferably 5 μm or less, and more preferably 3 μm or less. The tin coating 20 satisfying this range of film thickness allows the graphite particles 13 to be exposed therethrough, and retains the graphite fine particles removed from the graphite particles 13 during sliding of the sliding component 1 and suppresses an increase in sliding resistance due to the tin coating 20. Preferably, the thickness of the tin coating 20 is 0.5 μm or more. The tin coating 20 satisfying this range of film thickness easily retains the graphite fine particles fallen from the graphite particles on the tin coating 20 during sliding.

2. Method for Manufacturing Sliding Components

The following describes a method for manufacturing the sliding component 1 as described above.

2-1. Preparation Step

First, an iron substrate 10 is prepared, which makes up a sliding component 1. The iron substrate 10 includes the graphite particles 13 that are dispersed in the above-mentioned iron base 11. This embodiment prepares spheroidal graphite cast iron that is an example of the iron substrate 10. The surface of the iron base 11 (at least the surface that is the sliding surface) may be subjected to quenching treatment, nitrocarburizing treatment, or nitriding treatment, and this surface of the iron base 11 may be polished.

2-2. Film Forming Step

Next, a tin coating 20 is formed on the surface of the iron substrate 10, the tin coating 20 including tin as a main material. In the film forming step, the tin coating 20 may be formed by coating the surface of the iron base 11 with the melt prepared by melting the tin material (metal material) containing tin as the main material (hot dip coating). Alternatively, the tin coating 20 may be formed by other methods of electroplating, CVD, and PVD. The film formation method is not limited particularly as long as subsequent secondary processing allows graphite particles 13 originating from the iron substrate 10 to be exposed through the tin coating 20.

Figure 2:
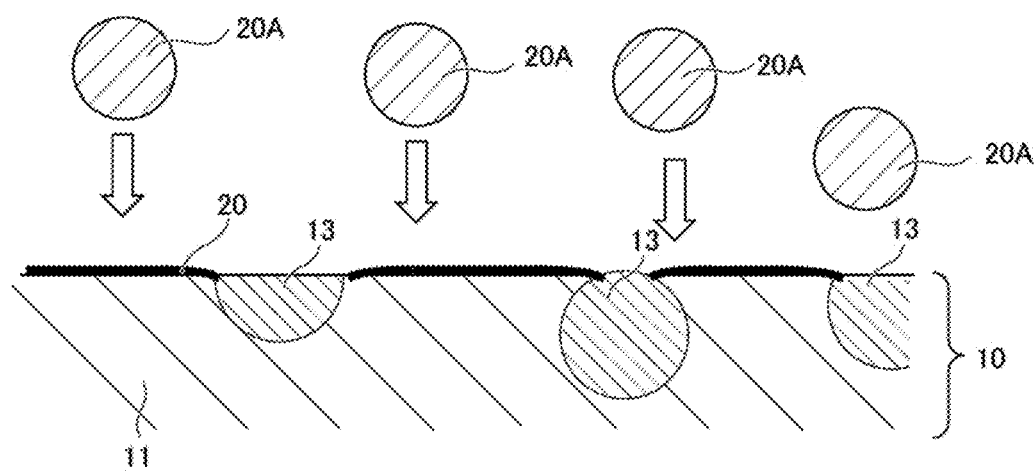
FIG. 2 shows an example of a method for manufacturing the sliding component of FIG. 1.

As a result of the inventors' intensive study, it was found that when tin particles 20A in the solid state were projected onto the surface of the iron substrate 10, where graphite particles 13 were exposed, tin hardly adhered to the exposed graphite particles 13, but adhered to the surface of the iron base 11. In a preferable embodiment, therefore, as shown in FIG. 2, the film forming step projects tin particles 20A including tin as a main material to let a part of the tin particles 20A adhere. This allows a part of the tin particles 20A to adhere so as to form a tin coating 20 while exposing graphite particles 13 from the surface of the iron substrate 10.

Note here that the tin particles 20A are made of a soft metal material that is less work hardening. The tin particles 20A including tin as a main material mean that the tin particles 20A include 50% by mass or more of tin, which may include tin and unavoidable impurities or may include another metal material added to 50% by mass or more of tin. Considering the deformation and adhesion of the tin particles 20A when projected onto the iron substrate 10, the tin particles 20A including another metal material added preferably have the Vickers hardness in the range of Hv 5 to 100. As mentioned above, examples of the other metal materials include silver, gold, platinum, zinc, antimony, lead, indium, and bismuth.

2-3. Heat Treatment Step

Following the film forming step, a heat treatment step may be conducted to the tin coating. Specifically, the heat treatment step heats the tin coating 20 at a temperature of 120° C. or higher, preferably 180° C. or higher. This heat treatment step melts the tin material of the tin coating 20 at the interface between the iron base 11 of the iron substrate 10 and the tin coating 20, which enhances the adhesion of the tin coating 20 to the iron base 11 and smooths the surface of the tin coating 20.

Preferably, the heating is conducted at a temperature equal to or higher than the melting point of the tin material of the tin coating 20 (when the tin material includes only tin, for example, the temperature is the melting point of tin, 232° C. or higher). This leads to the above-mentioned effect more reliably, and also achieves a more uniform tin coating 20 on the surface of the iron base 11. In the heat treatment step, the temperature to heat the tin coating 20 is preferably 300° C. or lower to suppress the formation of a compound with iron in the iron base. The heating duration is preferably in the range of 0.5 to 5 hours, although it depends on the heating temperature.

3. Sliding Environment of Sliding Component 1 and its Effect

The sliding component 1 according to the present embodiment preferably slides (is used) in an environment in which lubricating oil or grease is present on the sliding surface, and more preferably in an environment in which lubricating oil is forcibly supplied to the sliding surface.

Conventionally, a sliding component including cast iron only includes graphite particles exposed on the surface of the sliding component that act as a solid lubricant. In this case, the graphite removed from the graphite particles will be washed away with lubricating oil or grease and fall off the sliding surface. As a result, the effect of enhancing sliding characteristics from the graphite removed from the graphite particles cannot be expected so much.

In contrast, in the present embodiment, the fine particles of graphite that are removed from the graphite particles 13 during sliding are retained by the tin coating 20 formed on the surface of the sliding component 1. This means that not only the graphite particles 13 dispersed in the iron substrate 10 but also the graphite fine particles adhering to the tin coating 20, which are mixed with the tin coating 20, improve the sliding characteristics of the sliding component 1. Further, the tin coating 20 is a soft metal, and thus flows plastically during sliding and easily follows the surface of the mating member, thereby enhancing running-in property with the sliding surface of the mating member.

Combining these functions, as is clear from the experiments by the inventors described later, the present embodiment not only reduces the friction coefficient of the sliding component 1 but also suppresses the fluctuation of the friction coefficient of the sliding component 1 during sliding. Further, the fine particles of graphite adhering to the tin coating 20 can prevent the tin coating 20 of the sliding component 1 from transferring to the surface of the mating member of the sliding.

Second Embodiment

Figure 3:
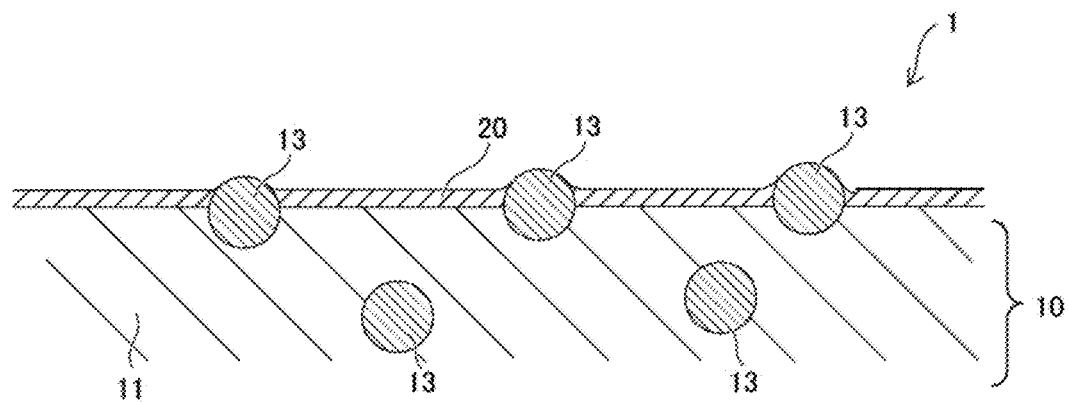
FIG. 3 is a schematic cross-sectional view showing an example of a sliding component that is a second embodiment.
Figure 4:
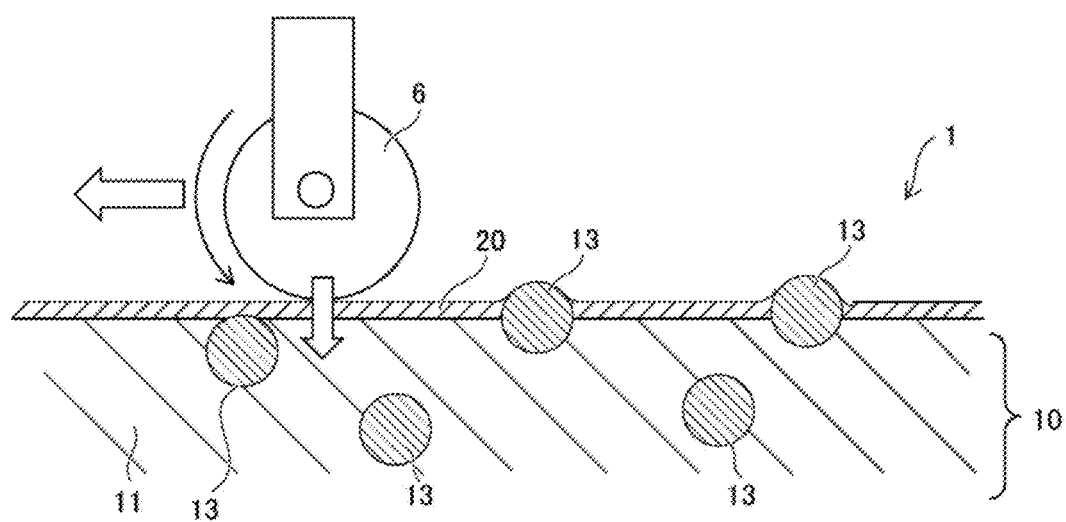
FIG. 4 shows an example of a method for manufacturing the sliding component of FIG. 3.

Referring to FIGS. 3 and 4, the following describes a sliding component 1 according to a second embodiment, and a method for manufacturing it. The sliding component 1 according to the second embodiment differs from the sliding component 1 according to the first embodiment in the state of the surface of the iron substrate 10. The following therefore omits the detailed descriptions on the same configuration as in the sliding component 1 according to the first embodiment and on the same step in the manufacturing method.

As shown in FIG. 3, the graphite particles 13 in the present embodiment protrude from the surface of the iron substrate 10 (iron base 11), and protrusions of the graphite particles 13 are exposed through the tin coating 20. The amount of protrusions of the graphite particles 13 from the surface of the iron base 11 of the iron substrate 10 depends on the material type of spheroidal graphite cast iron.

The sliding component 1 including these graphite particles 13 is prepared by pressing process such as roller burnishing (pressing step). Specifically, the pressing step may be performed before the film forming step or after the heat treatment step described in the first embodiment. In a preferable embodiment, the pressing step is performed after the film forming step and before the heat treatment step.

Specifically, as shown in FIG. 4, the pressing step includes pressing of the sliding component 1 with the tin coating 20 formed thereon with a roller-like pressing member 6 so as to press the surface of the tin coating 20 toward the iron substrate, thus letting the graphite particles 13 protrude from the surface of the iron substrate 10.

The present embodiment performs the pressing step after the film forming step, which suppresses falling-off of the graphite particles 13 from the iron substrate 10 due to the projection of tin particles when the film forming step is performed after the pressing step. Further, the present embodiment presses the tin coating 20 formed at the film forming step, which enhances the adhesion of the tin coating 20 to the surface of the iron base 11, and also favorably exposes the graphite particles 13 from the surface of the tin coating 20.

Further, the present embodiment may perform a heat treatment step as needed. In this case, the pressing step before the heat treatment step enhances the adhesion of the tin coating 20 to the surface of the iron base 11, and the following heat treatment step further enhances the adhesion of the tin coating 20 to the surface of the iron base 11.

Preferably, the pressing toward the iron substrate 10 compressively elastically deforms the surface layer of the iron substrate 10 to let the graphite particles protrude from the surface of the iron base 11. Specifically, the surface pressure applied to the iron substrate 10 during the pressing process is preferably in the range of 0.1 to 1.0 GPa. Such pressing allows the graphite particles 13 to protrude from the surface of the iron base 11 so that the graphite particles 13 are squeezed from the surface layer of the iron substrate 10 to the surface thereof, and also suppresses the plastic deformation of the iron base 11 of the iron substrate 10, thus reducing work hardening of the iron substrate 10. As a result, the tin coating 20 of the sliding component 1 easily follows the surface of the mating member during sliding, thereby preventing localized surface pressure from acting on the sliding surface.

The sliding component 1 according to the second embodiment includes the graphite particles 13 protruding from the surface of the iron substrate 10, and the protrusions of the graphite particles 13 are exposed through the tin coating 20. These graphite particles 13 protruding from the surface of the iron substrate 10 come into contact with the mating member and are easily scraped during sliding of the sliding component 1, and these scraped graphite fine particles are retained on the tin coating 20. As a result, the graphite particles 13 exert the solid lubrication function better, which further reduces the friction coefficient of the sliding component 1.

Third Embodiment

Figure 5:
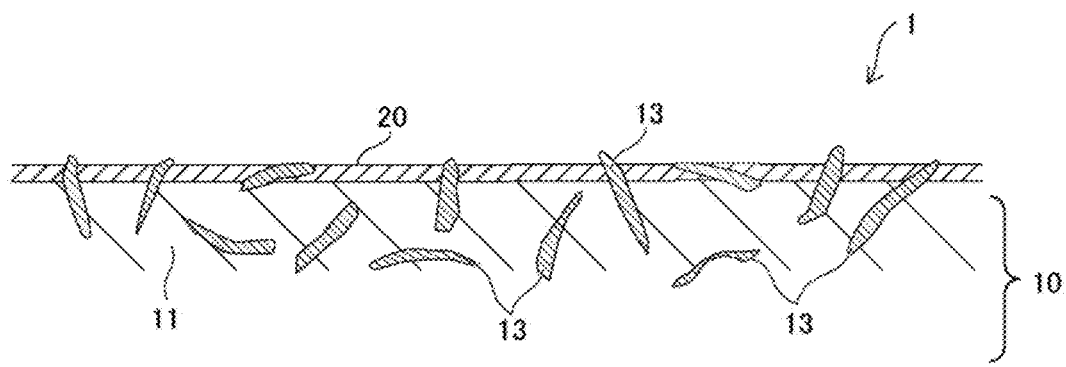
FIG. 5 is a schematic cross-sectional view showing an example of a sliding component that is a third embodiment.
Figure 6:
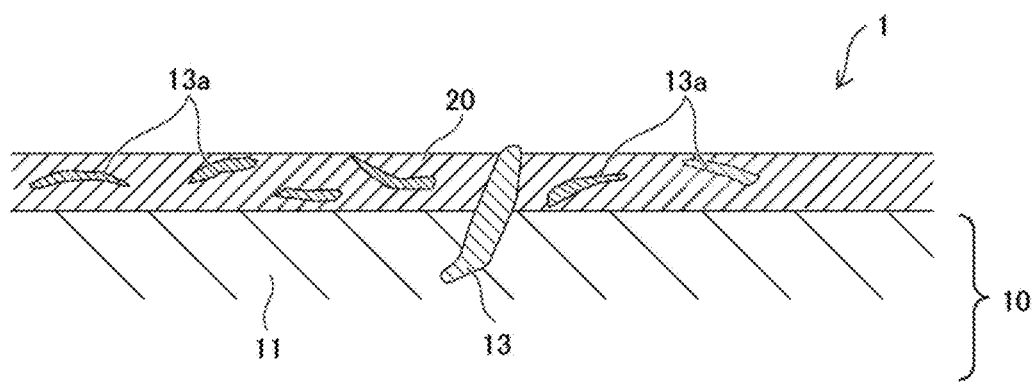
FIG. 6 is a schematic cross-sectional view showing the sliding component of FIG. 5 during sliding.

Referring to FIGS. 5 and 6, the following describes a sliding component 1 according to a third embodiment, and a method for manufacturing it. The sliding component 1 according to the third embodiment differs from the sliding component 1 according to the second embodiment in the iron substrate 10 including scaly graphite particles 13 dispersed therein. The following therefore omits the detailed descriptions on the same configuration as in the sliding component 1 according to the second embodiment and on the same step in the manufacturing method.

As shown in FIG. 5, the present embodiment describes scaly graphite particles as an example of the graphite particles 13 and gray cast iron described above as an example of the iron substrate 10 including these scaly graphite particles 13. When the gray cast iron is used, the iron base of the iron substrate 10 may be made of ferrite or a material including ferrite a lot. Examples of the iron substrate include FC100, FC150, FC200, and FC250 (JIS standard). In this case, the iron base can contain more graphite particles. The iron base of the iron substrate may include pearlite, and examples of the iron substrate include FC300 and FC350 (JIS standard). The iron substrate may be carburized, nitrided, or nitrocarburized.

As shown in FIG. 6, the present embodiment includes fine scaly graphite particles 13 as compared with the spheroidal graphite cast iron in the first embodiment. Therefore, the iron substrate 10 having the same carbon content includes finer graphite particles 13 dispersed there. As a result, as shown in FIG. 6, these finer graphite particles 13a are allowed to be more uniformly dispersed in the tin coating during sliding, which further reduces the friction coefficient of the sliding component 1 and also suppresses fluctuations in the friction coefficient.

Similar to the second embodiment, the present embodiment is configured so that the scaly graphite particles 13 protrude from the surface of the iron base 11 and are exposed through the surface of the tin coating 20. Similar to the first embodiment, the graphite particles can be exposed through the tin coating by the same manufacturing method as the manufacturing method described in the first embodiment without performing the pressing process. It is clear from Example 7 described later that this sliding component also enhances the sliding characteristics.

EXAMPLES

The following describes examples of the present invention.

The disc test pieces according to Example 1 and Comparative Examples 1 to 3 were prepared, and the synergistic effect from the iron substrate in which graphite particles were dispersed and the tin coating was confirmed.

Example 1

A sliding component of Example 1 was prepared as follows. First, an iron substrate (spheroidal graphite cast iron: FCD450) was prepared, where the iron base was ferrite, and spheroidal graphite particles were dispersed in this iron base. Specifically, a ring-shaped disc test piece having an outer diameter of 44 mm, an inner diameter of 20 mm, and a thickness of 7 mm was cut out from an ingot of spheroidal graphite cast iron by turning. Next, the donut-shaped surface of the disc test piece was polished with a diamond slurry abrasive to an arithmetic mean roughness Ra of 0.01 µm or less.

Next, tin particles with a particle size of 70 µm in a solid state were projected onto the polished surface by a direct-pressure shot peening system to deposit a tin coating with a thickness in the range of 1 to 5 µm. The projecting conditions were a projecting pressure of 0.7 MPa, a projecting distance of 30 mm, and projecting duration of 10 minutes. It was confirmed that the graphite particles of the iron substrate were exposed from the surface of the obtained tin coating. After the film formation, the disc test piece (tin coating) was heated at 240° C. for 3 hours.

Comparative Example 1

A sliding component was prepared similar to Example 1. The difference from Example 1 was that the iron substrate used included an iron base that did not include graphite particles (carbon steel for machine structure: S45C (JIS standard)). Under the same conditions as in Example 1, a tin coating was formed on the surface of the iron base.

Comparative Example 2

A disc test piece of Comparative Example 2 did not have a tin coating on the disc test piece of Example 1.

Comparative Example 3

A disc test piece of Comparative Example 3 did not have a tin coating on the disc test piece of Example 1, and included graphite particles protruding from the iron base by roller burnishing.

(Measurement of Coefficient of Friction)

Coefficients of friction were measured for the disc test pieces according to Example 1 and Comparative Examples 1 to 3. Specifically, a ring test piece made of carbon steel (S45C (JIS standard)) having an outer diameter of 40 mm, an inner diameter of 30 mm, and a thickness of 14 mm was prepared. The donut-shaped end face of the ring test piece to come in contact with the disc test piece was polished with a diamond slurry abrasive to an arithmetic mean roughness Ra of 0.01 µm or less.

Figure 7:
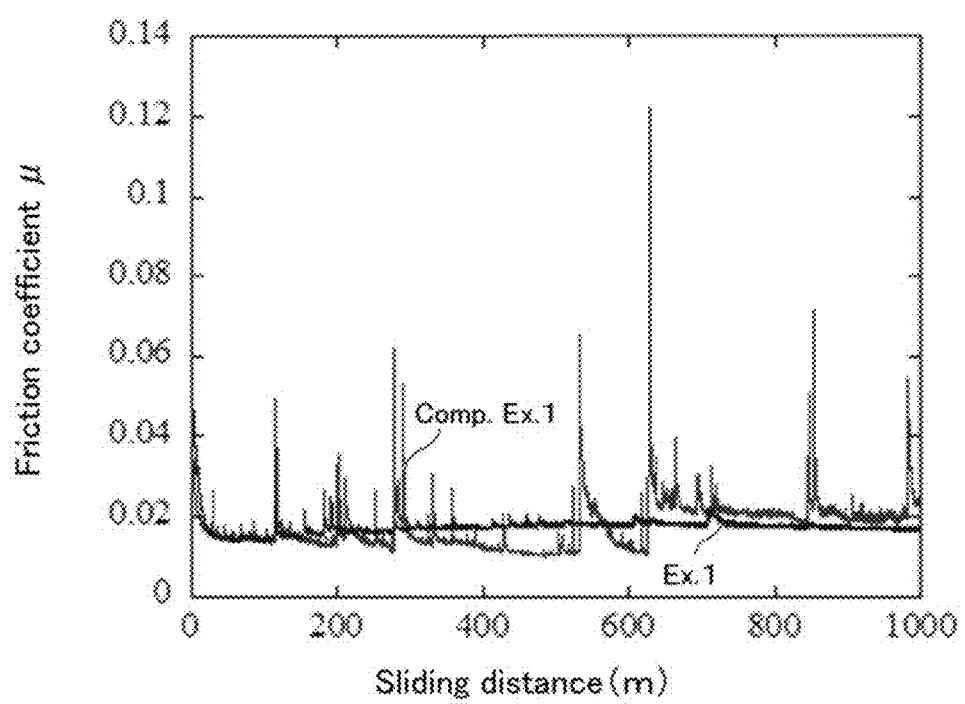
FIG. 7 is a graph showing the result of the friction test for Example 1 and Comparative Example 1.
Figure 8A:
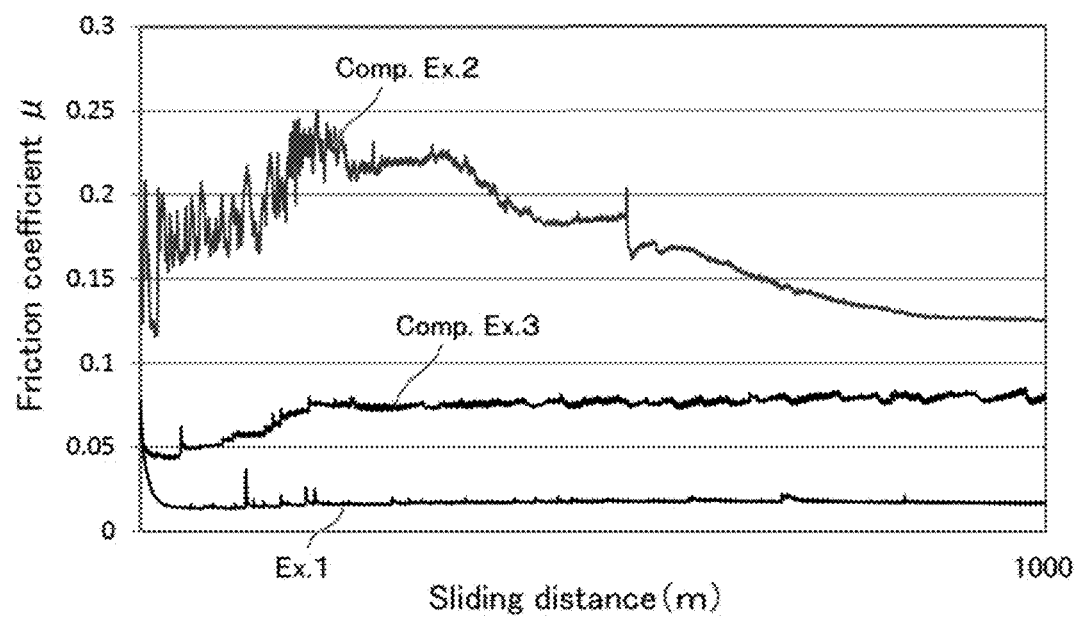
FIG. 8A is a graph showing the result of the friction test for Example 1 and Comparative Examples 2 and 3.
Figure 8B:
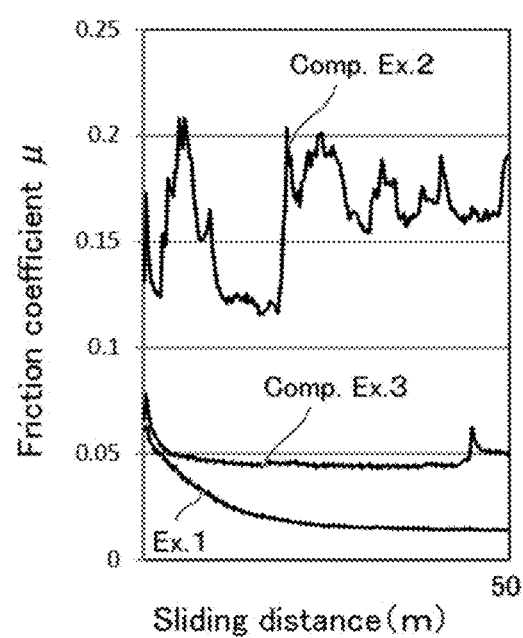
FIG. 8B is a graph showing the result of the friction test shown in FIG. 8A at the initial stage.
Figure 8C:
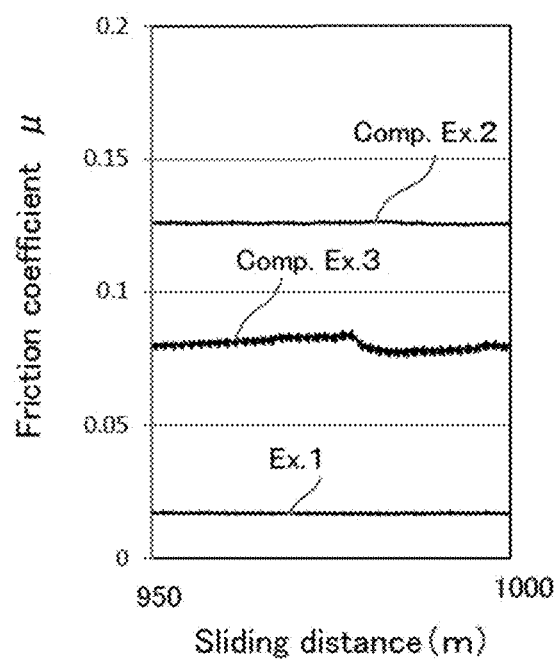
FIG. 8C is a graph showing the result of the friction test shown in FIG. 8A at the last stage.

The donut-shaped end face of the ring test piece was pressed against the surface of the disc test piece on which the tin coating was formed, and the ring test piece was slid. For the sliding conditions, the load was 300 N, the friction speed (peripheral speed) was at 0.25 m/s, and the measurement was conducted up to a friction distance of 1000 mm. Lubricating oil PAO4 (lubricating oil having a viscosity characteristic of 4 sct at 40° C.) was used for the disc test piece and the ring test piece, and 0.2 ml of the oil was supplied to the contact interface before the test. The test was conducted in a room temperature atmosphere. FIGS. 7 and 8A to 8C show the result. FIG. 7 is a graph showing the result of the friction test for Example 1 and Comparative Example 1. FIG. 8A is a graph showing the result of the friction test for Example 1 and Comparative Examples 2 and 3. FIG. 8B is a graph showing the result of the friction test shown in FIG. 8A at the initial stage, and FIG. 8C is a graph showing the result of the friction test shown in FIG. 8A at the last stage.

The result shown in FIG. 7 indicates that the fluctuations in the coefficient of friction of the disc test piece according to Example 1 was smaller than that of Comparative Example 1. Based on this result, the tin coating was formed on the sliding surface of the disc test piece according to Example 1 so that the graphite particles were exposed, and the graphite fine particles partially removed from the graphite particles during sliding were retained on the tin coating stably, which presumably resulted in small fluctuation of the friction coefficient of this disc test piece.

As shown in FIG. 8A, the coefficient of friction of the disc test piece according to Example 1 was smaller than those of the disc test pieces of Comparative Examples 2 and 3. As can be seen from the results of friction test at the initial and last stages of sliding shown in FIGS. 8B and 8C, the fluctuation of the friction coefficient of the disc test piece for Example 1 was smaller than those of Comparative Examples 2 and 3. In the test pieces of Comparative Examples 2 and 3, the graphite particles were dispersed in the iron substrate, and during sliding, some of the graphite fine particles removed from the graphite particles were pushed out from the sliding surface, and further, the iron base of the disc test piece was in direct contact, presumably resulting in the results shown in FIGS. 8A to 8C.

The disc test pieces according to Examples 2 and 3 were prepared as follows, and a test to observe the surface state of the tin coating was conducted before and after sliding.

Example 2

A disc test piece was prepared in the same way as in Example 1.

Example 3

A disc test piece was prepared in the same way as in Example 1. This example was different from Example 1 in that, following the film formation of the tin coating, roller burnishing was performed before the heat treatment.

Figure 9A:
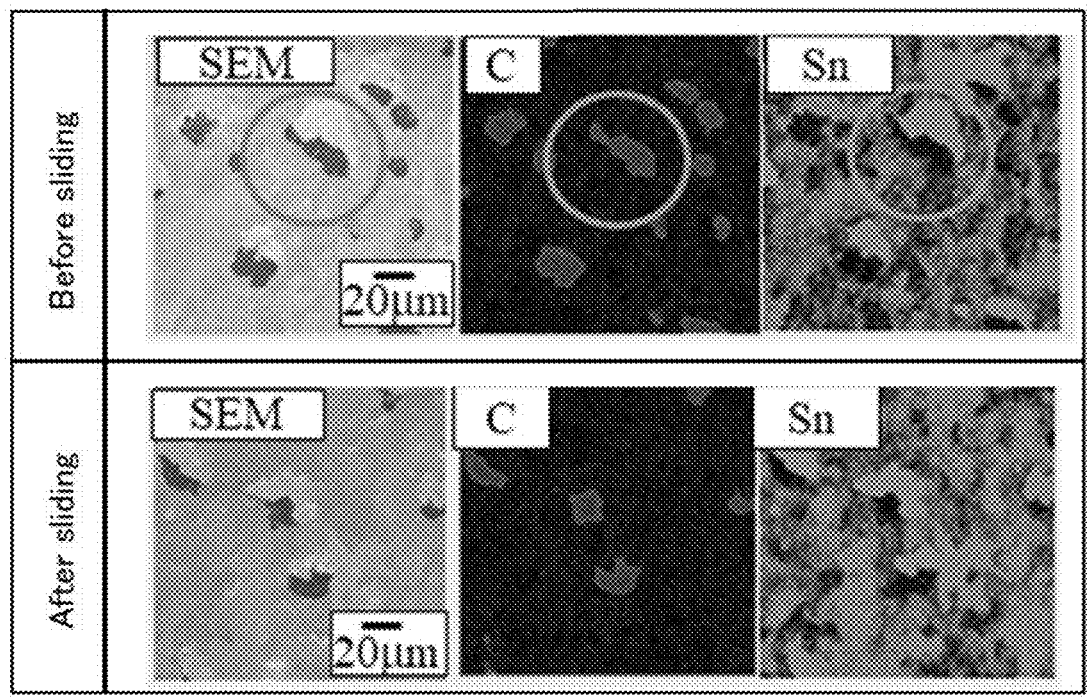
FIG. 9A is an SEM photograph before and after the friction test for Example 2 and a photograph showing the distribution of carbon and tin by EDX.
Figure 9B:
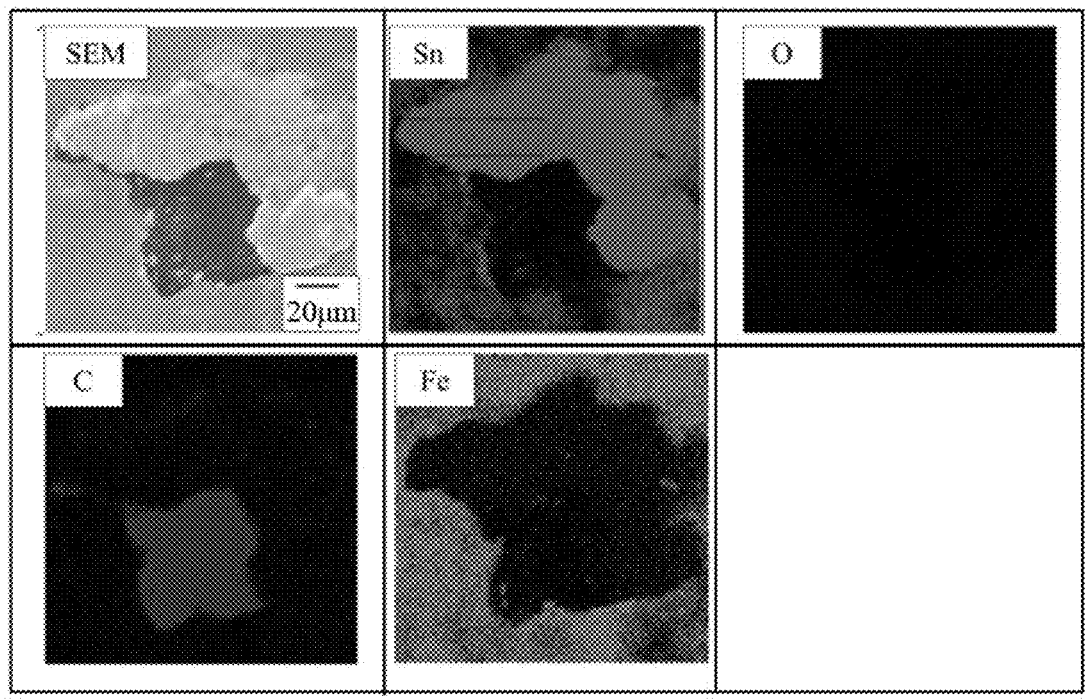
FIG. 9B is an SEM photograph after the friction test for Example 2 and a photograph showing the distribution of carbon, tin, iron and oxygen by EDX.
Figure 9C:
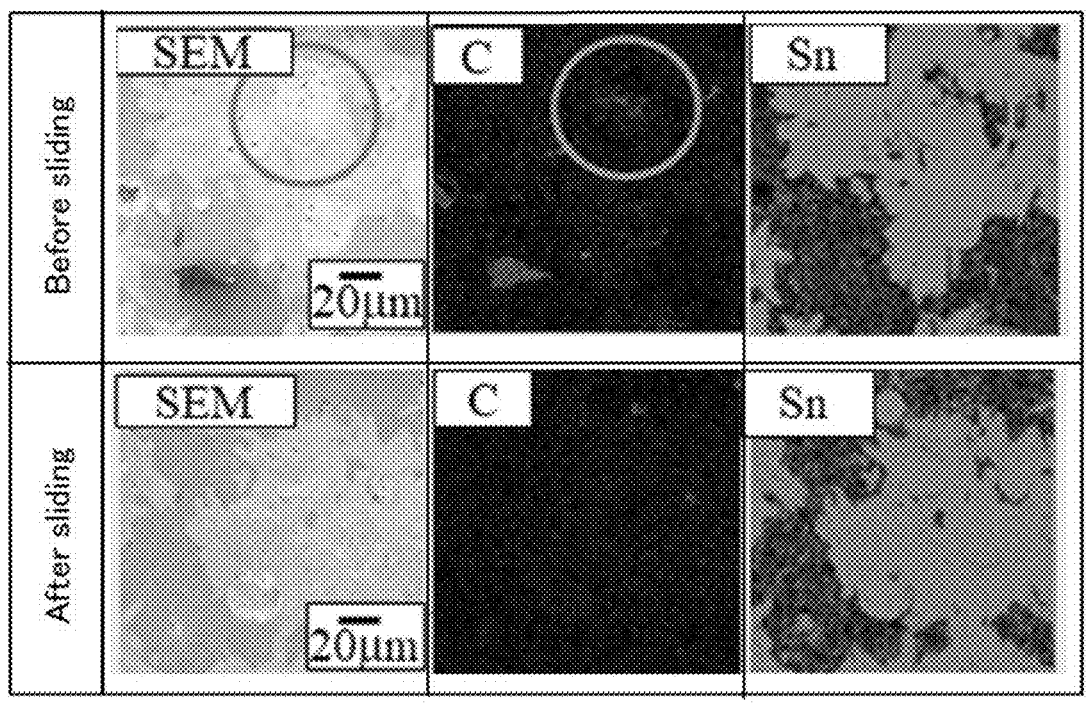
FIG. 9C is an SEM photograph before and after the friction test for Example 3 and a photograph showing the distribution of carbon and tin by EDX.

For the disc test pieces of Example 2 and Example 3, the surface of the tin coating was observed with a scanning electron microscope (SEM), and the distribution of certain elements was measured by energy dispersive X-ray (EDX). Then, friction test similar to Example 1 was conducted on the disc test pieces Examples 2 and 3, and the surface of the tin coating was observed by SEM and the distribution of certain elements was measured by EDX. FIGS. 9A to 9C show the results. FIG. 9A is an SEM photograph before and after the friction test for Example 2 and a photograph showing the distribution of carbon and tin by EDX. FIG. 9B is an SEM photograph after the friction test for Example 2 and a photograph showing the distribution of carbon, tin, iron and oxygen by EDX. FIG. 9C is an SEM photograph before and after the friction test for Example 3 and a photograph showing the distribution of carbon and tin by EDX.

As shown in FIGS. 9A and 9C, it was found that graphite particles were exposed on the surface of the tin coating before the friction test in both Examples 2 and 3, and graphite particles or graphite fine particles removed from the graphite particles were present while being mixed with tin also on the surface of the tin coating after the friction test. The adhesion between tin and graphite is not very strong, and presumably graphite particles were exposed through the tin coating when the tin coating was formed. FIG. 9B indicates that tin covered so as to surround the graphite fine particles removed after sliding, and presumably the graphite fine particles were physically held by tin.

Disc test pieces for Examples 4 and 5 were prepared as follows, and a test was conducted to confirm the effect of a tin coating that was formed by adding zinc added to tin and of the pressing process.

Example 4

A disc test piece was prepared in the same way as in Example 1. The difference from Example 1 is that a tin coating including zinc added to tin was formed using particles including zinc added to tin as a main material. The content of zinc contained in the tin coating was 15% by mass.

Example 5

A disc test piece was prepared in the same way as in Example 4. This example was different from Example 4 in that, following the film formation of the tin coating and before the heat treatment, roller burnishing was performed.

Comparative Example 4

A disc test piece was prepared in the same way as in Comparative Example 2. That is, Comparative Example 4 was a test piece that did not have a tin coating, and the surface of the iron substrate was polished.

Figure 10:
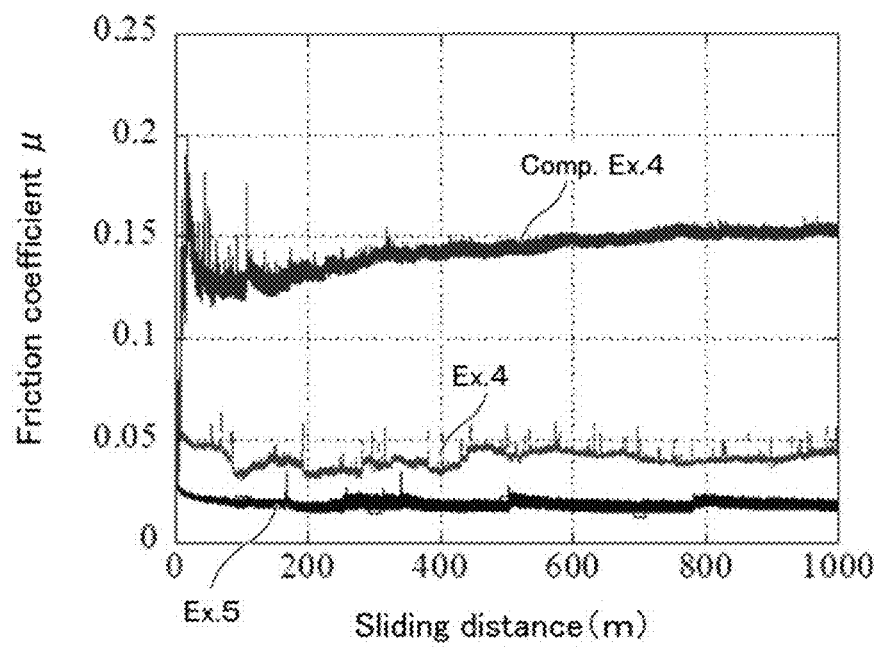
FIG. 10 is a graph showing the result of the friction test for Examples 4 and 5 and Comparative Example 4.

Friction test was performed for the disc test pieces according to Examples 4 and 5 and Comparative Example 4. FIG. 10 shows the result.

As shown in FIG. 10, the coefficient of friction of the disc test piece in Comparative Example 4 fluctuated greatly at the initial stage of sliding, and was poor in the initial running-in property. It had the coefficient of friction at the end of test that was 0.15. The disc test piece in Example 4 had good initial running-in property compared to that in Comparative Example 4, and the friction coefficient at the end of the test was lower than that in Comparative Example 4 and was 0.04. The disc test piece in Example 5 had better initial running-in property than those in Comparative Example 4 and Example 4, and the friction coefficient at the end of the test was lower than those in Comparative Example 4 and Example 4 and was 0.02.

This indicates that a tin coating including tin as the main material formed on the surface of an iron substrate retains the graphite fine particles (removed graphite) of graphite particles originating from the iron substrate. This results in reduction in the coefficient of friction of the sliding component, and also in reduction of the fluctuations of the coefficient of friction. In addition to this, such effects become more remarkable when the graphite particles protrude from the surface of the iron substrate as in Example 5.

The disc test pieces according to Examples 6-1 to 6-4 were prepared as follows, and test to confirm the effect from the heat treatment of the tin coating was conducted.

Examples 6-1 to 6-4

Disc test pieces of Examples 6-1 to 6-4 were prepared in the same way as in Example 1. Example 6-1 was different from Example 1 in that heat treatment was not performed for the tin coating. Examples 6-2 and 6-3 were different from Example 1 in that the temperatures of heat treatment for the tin coating were set at 180° C. and 210° C., respectively. Example 6-4 was prepared under the same conditions as in Example 1.

Figure 11:
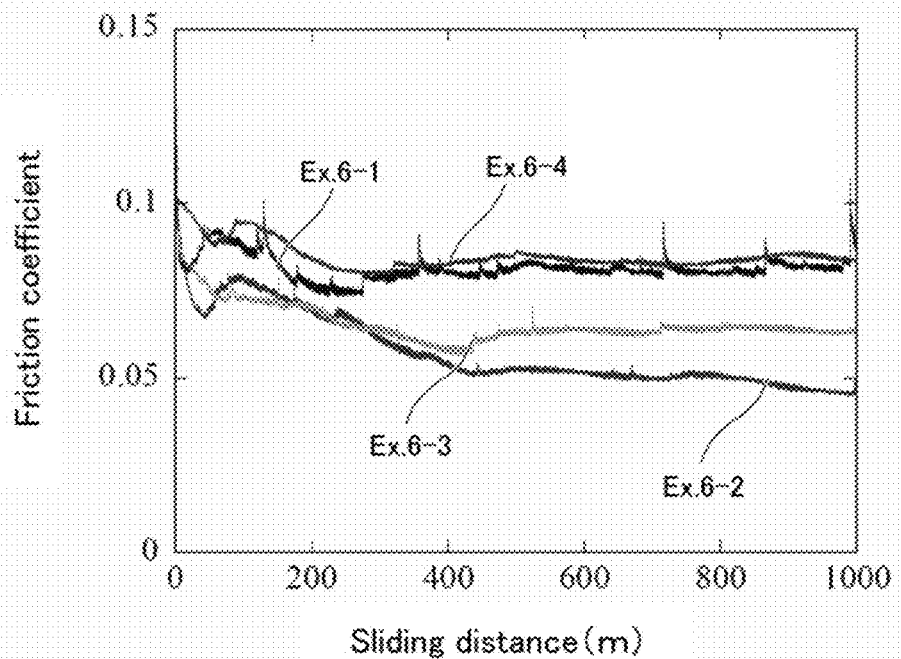
FIG. 11 is a graph showing the result of the friction test for Examples 6-1 to 6-4.

Friction test was conducted for the disc test pieces of Examples 6-1 through 6-4 in the same manner as in Example 1. FIG. 11 shows the result. As shown in FIG. 11, Examples 6-2 to 6-4 subjected to the heat treatment as well as Example 6-1 not subjected to the heat treatment had low coefficients of friction.

The test pieces subjected to the heat treatment had less amount of abrasion of the tin coating than that not subjected to the heat treatment, and presumably enhanced in adhesion of the tin coating. In particular, when the tin coating was heated above the melting point of tin, the tin coating completely melted, so that the tin coating in this case had the highest adhesion, and thus presumably had high wear resistance.

Example 7

Figure 12:
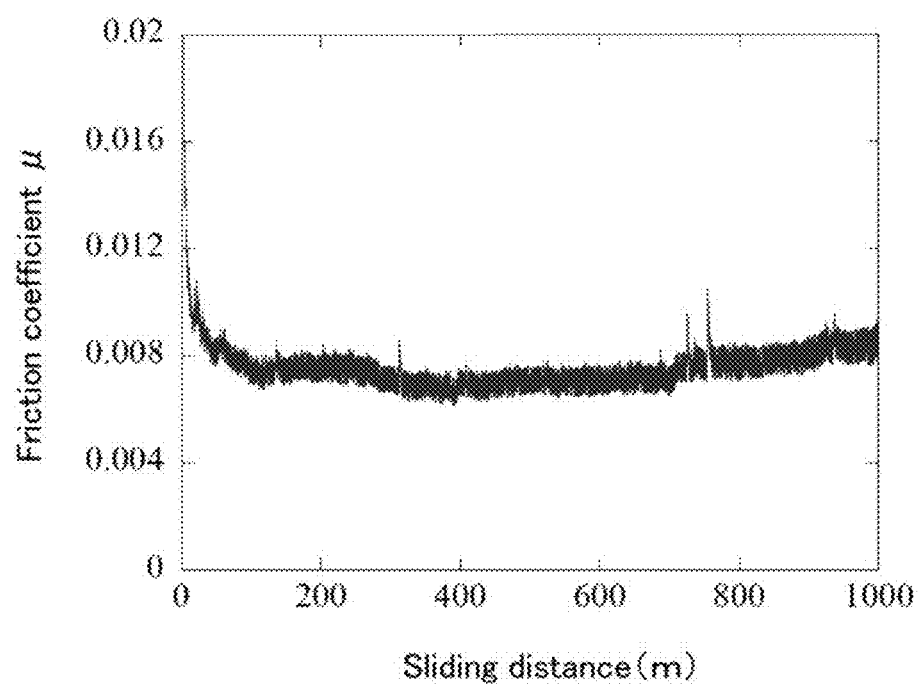
FIG. 12 is a graph showing the result of the friction test for Example 7.

A disc test piece according to Example 7 was prepared, and test to confirm the effect from the shape of carbon particles in the iron substrate was conducted. The difference from Example 1 was that the substrate (gray cast iron: FC250) used included scaly graphite particles that were dispersed in an iron base, and a tin coating was formed on the iron substrate in the same manner as in Example 1. Friction test was conducted in the same manner as in Example 1. FIG. 12 shows the result.

As shown in FIG. 12, the disc test piece of Example 7 had the lowest coefficient of friction among the examples and comparative examples described above. Presumably, this is because the scaly graphite particles dispersed in the iron substrate enabled more uniform dispersion of finer graphite particles in the tin coating during sliding than in the case of spheroidal graphite particles. Presumably, the friction coefficient will be reduced by further pressing process (roller burnishing) on the disc test piece of Example 7.

The present invention is not limited to the above embodiments. The above embodiments are just examples, and any configuration based on substantially the same technical concept described in the claims of the present invention and that produces similar effects is included in the technical scope of the present invention.

REFERENCE SIGNS LIST

1 Sliding component
10 Iron substrate
11 Iron base
13 Graphite particles
13a Graphite fine particles
20 Tin coating

The invention claimed is:

1. A method for manufacturing a sliding component, comprising:
    a preparation step of preparing an iron substrate including graphite particles dispersed in an iron base, the graphite particles being exposed on a surface; and
    a film forming step of forming a tin coating on the surface of the iron substrate, the tin coating including tin as a main material,
    the film forming step forming the tin coating so that the graphite particles are exposed through the tin coating, and
    the film forming step projecting tin particles including tin as a main material to a surface of the iron base to let a part of the tin particles adhere to the surface of the iron base where the graphite particles are not exposed.

2. The method for manufacturing a sliding component according to claim 1, wherein the preparation step prepares the iron substrate including the graphite particles that are scaly graphite particles.

3. The method for manufacturing a sliding component according to claim 1, wherein the film forming step projects the tin particles that are particles including tin or particles including zinc, silver, antimony, lead, indium, or bismuth added to tin to the iron substrate.

4. The method for manufacturing a sliding component according to claim 1, wherein, following the film forming step, the surface of the tin coating is pressed toward the iron substrate to let the graphite particles protrude from the surface of the iron base, and allow the graphite particles to be exposed through the surface of the tin coating.

5. The method for manufacturing a sliding component according to claim 1, further comprising a heat treatment step, following the film forming step, of heating the tin coating at a temperature of 120° C. or higher.

* * * * *